United States Patent
Ma et al.

(10) Patent No.: US 11,824,713 B2
(45) Date of Patent: Nov. 21, 2023

(54) CONFIGURATION METHOD AND APPARATUS

(71) Applicant: HUAWEI TECHNOLOGIES CO., LTD., Guangdong (CN)

(72) Inventors: Jingwang Ma, Shanghai (CN); Runze Zhou, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 289 days.

(21) Appl. No.: 17/131,231

(22) Filed: Dec. 22, 2020

(65) Prior Publication Data

US 2021/0111947 A1    Apr. 15, 2021

Related U.S. Application Data

(63) Continuation of application No. PCT/CN2019/092814, filed on Jun. 25, 2019.

(30) Foreign Application Priority Data

Jun. 26, 2018  (CN) .......................... 201810674390.9

(51) Int. Cl.
*H04L 41/082*      (2022.01)
*H04L 41/0866*     (2022.01)
(Continued)

(52) U.S. Cl.
CPC ........ *H04L 41/082* (2013.01); *H04L 41/0866* (2013.01); *H04L 41/0893* (2013.01); *H04L 41/12* (2013.01)

(58) Field of Classification Search
CPC .... H04L 41/08–41/0897; H04L 41/12–41/122
See application file for complete search history.

(56) References Cited

U.S. PATENT DOCUMENTS

2017/0070892 A1*  3/2017  Song ................. H04W 48/20
2017/0303259 A1  10/2017  Lee et al.
(Continued)

FOREIGN PATENT DOCUMENTS

CN          107770794 A       3/2018
CN          107889155 A       4/2018
(Continued)

OTHER PUBLICATIONS

3GPP TS 29.510 V1.0.0 (Jun. 2018), 3rd Generation Partnership Project; Technical Specification Group Core Network and Terminals; 5G System; Network Function Repository Services; Stage 3(Release 15), 65 pages.
(Continued)

*Primary Examiner* — Clayton R Williams
(74) *Attorney, Agent, or Firm* — WOMBLE BOND DICKINSON (US) LLP

(57) ABSTRACT

This application provides a configuration method. The method includes: receiving, by a network repository network element, a request message from a second network element, where the request message includes information about a network slice, and the request message is used to request to obtain status information of a system feature supported by the network slice; and sending, by the network repository network element based on the request message, the status information of the system feature supported by the network slice to the second network element. Based on this solution, the second network element may obtain, from the network repository network element, the status information of the system feature supported by the network slice. The status information of the system feature supported by the network slice includes status information of an NF service corresponding to the system feature.

20 Claims, 4 Drawing Sheets

(51) Int. Cl.
*H04L 41/0893* (2022.01)
*H04L 41/12* (2022.01)

(56) References Cited

U.S. PATENT DOCUMENTS

| | | | | |
|---|---|---|---|---|
| 2018/0316608 A1* | 11/2018 | Dowlatkhah | ......... | H04L 41/509 |
| 2018/0376407 A1* | 12/2018 | Myhre | ................ | H04W 76/27 |
| 2019/0123963 A1* | 4/2019 | Tang | .................... | H04W 48/18 |
| 2019/0357130 A1* | 11/2019 | Garcia Azorero | ...... | H04W 8/08 |
| 2021/0111947 A1* | 4/2021 | Ma | ......................... | H04L 67/51 |

FOREIGN PATENT DOCUMENTS

| | | | |
|---|---|---|---|
| CN | 108024270 | A | 5/2018 |
| EP | 3528466 | A1 | 8/2019 |
| WO | 2017219969 | A1 | 12/2017 |
| WO | 2018067780 | A1 | 4/2018 |

OTHER PUBLICATIONS

Nokia, Alcatel-Lucent Shanghai Bell, Verizon, ATandT, Pseudo-CR on NF Service Discovery and Selection Requirements. 3GPP TSG CT4 Meeting #79, Krakow, Poland; Aug. 21-25, 2017, C4-174233, 4 pages.

3GPP TR 23.742 V0.2.0 (Jun. 2018), 3rd Generation Partnership Project; Technical Specification Group Services and System Aspects; Study on Enhancements to the Service-Based Architecture(Release 16), 39 pages.

3rd Generation Partnership Project; Technical Specification Group Services and System Aspects;System Architecture for the 5G System;Stage 2(Release 15),3GPP TS 23.501 V2.0.1 (Dec. 2017), total 183 pages.

3GPP TS 23.502 V15.2.0 (Jun. 2018), 3rd Generation Partnership Project; Technical Specification Group Services and System Aspects; Procedures for the 5G System; Stage 2(Release 15), 308 pages.

* cited by examiner

CONFIGURATION METHOD AND APPARATUS

CROSS-REFERENCE TO RELATED APPLICATIONS

This application is a continuation of International Application No. PCT/CN2019/092814, filed on Jun. 25, 2019, which claims priority to Chinese Patent Application No. 201810674390.9, filed on Jun. 26, 2018. The disclosures of the aforementioned applications are hereby incorporated by reference in their entireties.

TECHNICAL FIELD

This application relates to the field of mobile communications technologies, and in particular, to a configuration method and apparatus.

BACKGROUND

In a current network architecture, a plurality of network slices are obtained through division on a common network infrastructure of a core network based on technologies such as virtualization, and the network slices are used to implement a network service required by a specific service or some services. To indicate a network slice of a specific type, information about the network slice may include a corresponding type of the network slice. The type of the network slice includes, for example, a network slice of an enhanced mobile broadband (eMBB) type, a network slice of an ultra-low latency type, and the like. In a next-generation communications network, different types of network slices support different system features (system feature). How to configure the system features has not been resolved yet.

SUMMARY

This application provides a configuration method and apparatus, to configure the system features.

According to a first aspect, this application provides a configuration method. The method includes: receiving, by a network repository network element, configuration information from a network slice management network element, where the configuration information includes information about a network slice, a system feature supported by the network slice, a network function (NF) corresponding to the system feature, and an NF service corresponding to the NF; and storing, by the network repository network element, the configuration information. Based on this solution, information related to the network slice can be configured for the network repository network element.

In an embodiment, the system feature includes a first system feature, an NF corresponding to the first system feature includes a first NF, the NF service corresponding to the NF includes a first NF service corresponding to the first NF, and the method further includes: receiving, by the network repository network element, a notification message from a first network element, where the first network element is a network element that supports the first NF, the notification message includes status information of an NF service of the first network element, and the status information of the NF service of the first network element includes status information of the first NF service; and determining, by the network repository network element, status information of the first system feature based on the status information of the first NF service. Based on this solution, the status information of the system feature in the configuration information can be updated.

In an embodiment, the status information of the NF service of the first network element includes a total quantity of times for which the NF service is invoked by a plurality of other network elements within preset duration and/or a quantity of times for which the NF service is separately invoked by a single other network element within preset duration.

According to a second aspect, this application provides a configuration method. The method includes: sending, by a network slice management network element, configuration information to a network repository network element, where the configuration information includes information about a network slice, a system feature supported by the network slice, a network function NF corresponding to the system feature, and an NF service corresponding to the NF; and receiving, by the network slice management network element, a configuration completion indication from the network repository network element. Based on this solution, information related to the network slice can be configured for the network repository network element.

According to a third aspect, this application provides a configuration method. The method includes: receiving, by a network repository network element, a request message from a second network element, where the request message includes information about a network slice, and the request message is used to request to obtain status information of a system feature supported by the network slice; and sending, by the network repository network element based on the request message, the status information of the system feature supported by the network slice to the second network element. Based on this solution, the second network element may obtain, from the network repository network element, the status information of the system feature supported by the network slice. The status information of the system feature supported by the network slice includes status information of an NF service corresponding to the system feature.

In an embodiment, the request message further includes a specified time period, and the request message is used to request to obtain the status information of the system feature supported by the network slice within the specified time period; and the sending, by the network repository network element based on the request message, the status information of the system feature supported by the network slice to the second network element includes: sending, by the network repository network element, the status information of the system feature supported by the network slice within the specified time period to the second network element.

In an embodiment, the status information of the system feature supported by the network slice within the specified time period includes a total quantity of times for which an NF service corresponding to the system feature is invoked by a plurality of other network elements within the specified time period and/or a quantity of times for which the NF service is separately invoked by a single other network element within the specified time period.

In an embodiment, the request message further includes a subscription period, and the request message is used to request to periodically obtain the status information of the system feature supported by the network slice; and the sending, by the network repository network element based on the request message, the status information of the system feature supported by the network slice to the second network element includes: periodically sending, by the network repository network element based on the subscription period in the request message, the status information of the system feature supported by the network slice to the second network element.

In an embodiment, the status information of the system feature supported by the network slice includes a total quantity of times for which an NF service corresponding to the system feature is invoked by a plurality of other network elements within the subscription period and/or a quantity of times for which the NF service is separately invoked by a single other network element within the subscription period.

According to a fourth aspect, this application provides a configuration method. The method includes: sending, by a second network element, a request message to a network repository network element, where the request message includes information about a network slice, and the request message is used to request to obtain status information of a system feature supported by the network slice; and receiving, by the second network element, the status information of the system feature supported by the network slice from the network repository network element. Based on this solution, the second network element may obtain, from the network repository network element, the status information of the system feature supported by the network slice. The status information of the system feature supported by the network slice includes status information of an NF service corresponding to the system feature.

In an embodiment, the request message further includes a specified time period, and the request message is used to request to obtain the status information of the system feature supported by the network slice within the specified time period; and the receiving, by the second network element, the status information of the system feature supported by the network slice from the network repository network element includes: receiving, by the second network element, the status information of the system feature supported by the network slice within the specified time period from the network repository network element.

In an embodiment, the status information of the system feature supported by the network slice within the specified time period includes a total quantity of times for which an NF service corresponding to the system feature is invoked by a plurality of other network elements within the specified time period and/or a quantity of times for which the NF service is separately invoked by a single other network element within the specified time period.

In an embodiment, the request message further includes a subscription period, and the request message is used to request to periodically obtain the status information of the system feature supported by the network slice; and the receiving, by the second network element, the status information of the system feature supported by the network slice from the network repository network element includes: receiving, by the second network element, the status information that is of the system feature supported by the network slice and that is periodically sent by the network repository network element based on the subscription period.

In an embodiment, the status information of the system feature supported by the network slice includes a total quantity of times for which an NF service corresponding to the system feature is invoked by a plurality of other network elements within the subscription period and/or a quantity of times for which the NF service is separately invoked by a single other network element within the subscription period.

In an embodiment, the request message in any one of embodiments of the first to the fourth aspects further includes a second system feature in the system feature supported by the network slice, and the status information of the system feature supported by the network slice includes status information of an NF service corresponding to the second system feature.

According to a fifth aspect, this application provides an apparatus. The apparatus may be a network repository network element, a network slice management network element, a second network element, or a chip. The apparatus has a function of implementing the embodiments of any one of the first aspect, the second aspect, the third aspect, or the fourth aspect. The function may be implemented by hardware, or may be implemented by hardware executing corresponding software. The hardware or the software includes one or more modules corresponding to the foregoing function.

According to a sixth aspect, an apparatus is provided, including a processor and a memory. The memory is configured to store a computer-executable instruction. When the apparatus runs, the processor executes the computer-executable instruction stored in the memory, so that the apparatus performs the configuration method according to any one of the first aspect or the possible embodiments of the first aspect, or performs the configuration method according to any one of the second aspect or the possible embodiments of the second aspect, or performs the configuration method according to any one of the third aspect or the possible embodiments of the third aspect, or performs the configuration method according to any one of the fourth aspect or the possible embodiments of the fourth aspect.

According to a seventh aspect, this application further provides a computer-readable storage medium. The computer-readable storage medium stores an instruction. When the instruction is run on a computer, the computer is enabled to perform the methods according to the foregoing aspects.

According to an eighth aspect, this application further provides a computer program product including an instruction. When the instruction is run on a computer, the computer is enabled to perform the methods according to the foregoing aspects.

According to a ninth aspect, this application further provides a system. The system includes the network repository network element in any one of the first aspect or the embodiments of the first aspect and the network slice management network element in the second aspect.

According to a tenth aspect, this application further provides a system. The system includes the network repository network element in any one of the third aspect or the embodiments of the third aspect, and the second network element in any one of the fourth aspect or the embodiments of the fourth aspect.

These aspects or other aspects of this application are clearer and easier to understand in descriptions of the following embodiments.

DESCRIPTION OF EMBODIMENTS

To make objectives, technical solutions, and advantages of this application clearer, the following further describes this application in detail with reference to the accompanying drawings. A specific operation method in method embodiments may also be applied to an apparatus embodiment or a system embodiment. In the descriptions of this application, unless otherwise stated, "a plurality of" means two or more than two.

A network architecture and a service scenario that are described in the embodiments of this application are intended to describe the technical solutions in the embodiments of this application clearer, and do not constitute a limitation on the technical solutions provided in the embodiments of this application. A person of ordinary skill in the art may know that with evolution of the network architecture and emergence of new service scenarios, the technical solutions provided in the embodiments of this application are also applicable to similar technical problems.

Figure 1:
FIG. 1 is a schematic diagram of a possible network architecture according to this application.

FIG. 1 is a schematic diagram of a possible network architecture according to this application. The network architecture includes a network slice management network element and a network repository network element.

In this application, the network slice management network element is used to configure the network repository network element, including configuration of information about a network slice, a system feature supported by the network slice, and a network function (NF) and an NF service that are corresponding to the system feature. In an implementation, the network slice management network element may be an operation, administration and maintenance (OAM) system.

The network repository network element may be, for example, a network repository function (NRF) network element in a 5$^{th}$ generation ( ) communications system. Functions of the network repository network element mainly include registration, deregistration, discovery, and the like of a network function and a service. The network repository network element may store description information of a deployed network function, for example, an identifier and an address of the network function, supported service information, or a network slice identifier. In future communication, for example, in a 6$^{th}$ generation (6G), the network repository network element may be referred to as an NRF network element, or may have another name. This is not limited in this application.

Figure 2:
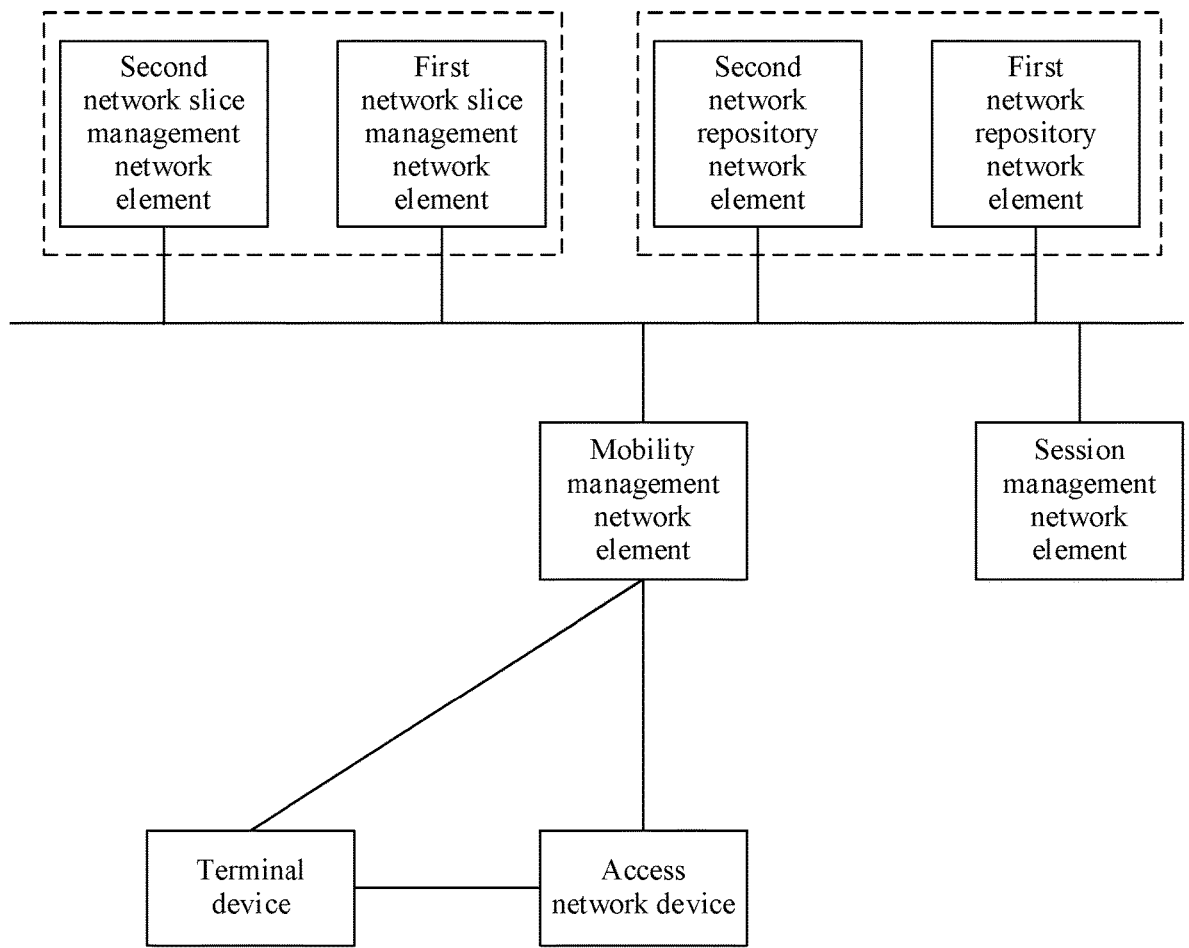
FIG. 2 is a schematic diagram of another possible network architecture according to this application.

FIG. 2 is a schematic diagram of another possible network architecture according to this application. The network architecture includes an access network device, a mobility management network element, a session management network element, a first network slice management network element, a second network slice management network element, a first network repository network element, and a second network repository network element.

The first network slice management network element is used to configure the first network repository network element on a core network side, and the second network slice management network element is used to configure the second network repository network element in an access network. In a specific implementation, the first network slice management network element and the second network slice management network element may be a same network element, or may be different network elements. The first network repository network element and the second network repository network element may be a same network element, or may be different network elements. For ease of description, this application uses an example in which the first network slice management network element and the second network slice management network element are the same network element and the first network repository network element and the second network repository network element are the same network element for description.

The terminal is a device having a wireless transceiver function, may be deployed on land, and includes an indoor device, an outdoor device, a hand-held device, or a vehicle-mounted device. The terminal may also be deployed on a water surface (for example, on a ship), and may also be deployed in air (for example, in an aircraft, a balloon, or a satellite). The terminal may be a mobile phone, a tablet, a computer having a wireless transceiver function, a virtual reality (VR) terminal, an augmented reality (AR) terminal, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, and the like.

The access network device is a device that provides a wireless communication function for a terminal. For example, the access network device includes but is not limited to: a next-generation base station (gNB) in 5G, an evolved NodeB (eNB), a radio network controller (RNC), a NodeB (NB), a base station controller (BSC), a base transceiver station (BTS), a home base station (for example, a home evolved NodeB, or a home NodeB, HNB), a baseband unit (BBU), a transmission point (TRP), a transmitting point (TP), a mobile switching center, and the like.

The session management network element is mainly used for session management in a mobile network, for example, session establishment, modification, and release. A specific function is, for example, allocating an internet protocol (IP) address to a user, or selecting a user plane network element that provides a packet forwarding function. In 5G, the session management network element may be a session management function (SMF) network element. In future communication, for example, in 6G, the session management network element may still be an SMF network element or have another name. This is not limited in this application.

The mobility management network element is mainly used for mobility management in a mobile network, for example, user location update, registration of a user with a network, and user switching. In 5G communication, the mobility management network element may be an access and mobility management function (AMF) network element. In future communication, for example, in 6G communication, the mobility management network element may still be an AMF network element or have another name. This is not limited in this application.

It may be understood that the foregoing functions may be network elements in a hardware device, may also be software functions running on dedicated hardware, or virtualized functions instantiated on a platform (for example, a cloud platform).

For ease of description, an example in which the mobility management network element is an AMF network element, the session management network element is an SMF network element, and the network repository network element is an NRF network element is used for description in the following of this application. Further, the AMF network element is briefly referred to as an AMF, the SMF network element is briefly referred to as an SMF, and the NRF network element is briefly referred to as an NRF. To be specific, all AMFs described in the following of this application may be replaced with mobility management network elements, all SMFs may be replaced with session management network elements, and all NRFs may be replaced with network repository network elements.

With reference to FIG. 1 and FIG. 2, the following describes a configuration method according to this application.

Figure 3:
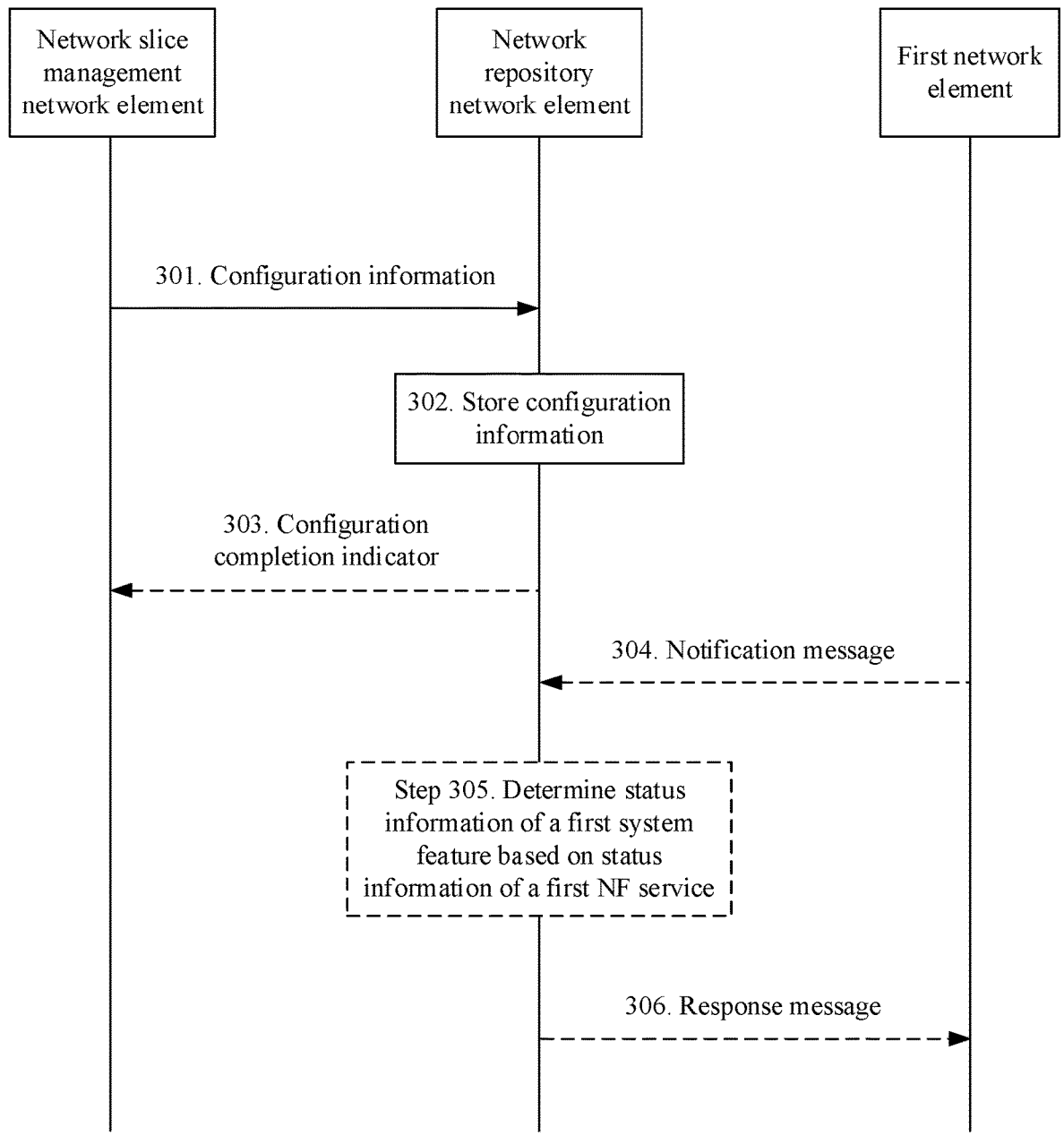
FIG. 3 is a flowchart of a configuration method according to this application.

FIG. 3 shows a configuration method according to this application, and the method is used to configure an NRF. The method includes the following operations.

Operation 301. A network slice management network element sends configuration information to an NRF. Correspondingly, the NRF may receive the configuration information.

The network slice management network element herein may be the network slice management network element shown in FIG. 1, or the first network slice management network element or the second network slice management network element shown in FIG. 2.

The configuration information includes information about a network slice, a system feature supported by the network slice, an NF and an NF service that are corresponding to the system feature.

The NF refers to an NF type, that is, a type of an NF that supports the system feature.

The NF service refers to a function that is disclosed through a service-oriented interface by a network element that supports an NF type. This function can be invoked by a network element of another NF type (requiring authorization). For example, when the NF is an AMF, the NF service is an AMF-related function that is on a network element supporting the AMF (for example, may be directly referred to as an AMF network element) and that can be invoked by a network element of another NF type (for example, an SMF network element).

The information about the network slice includes one or more pieces of single network slice selection assistance information (S-NSSAI).

The system feature refers to a network service provided by a network for a terminal or an external application. In one network slice, one or more system features may be deployed based on a service requirement. Correspondingly, to support and implement the one or more services, a corresponding network element needs to be deployed in an access network and a core network, and the deployed network element implements a network function service related to the system feature. For example, the system feature may include, but is not limited to one or a combination of an internet protocol (IP) data unit session (protocol data unit session, PDU session), a short message service over non-access stratum (SMS over NAS), a location service (LCS), and the like.

For example, when the system feature is SMS over NAS (for example, may be identified by a system feature short message service (SF_SMS)), the NF corresponding to the system feature may include a short message service function (SMSF), unified data management (UDM), and an AMF; the NF service corresponding to the NF may include Nsmsf_SMService (Nsmsf_SMService is an NF service of the SMSF), Nudm_UECM (Nudm_UECM is an NF service of the UDM), Namf_Communication (Namf_Communication is an NF service of the AMF), and the like.

When a network slice supports a system feature, a plurality of network elements of an NF type corresponding to the system feature may be deployed. The plurality of network elements support a same NF service, and the NF service may be invoked by a network element of another NF type, to implement a corresponding system feature through interaction and cooperation between the network elements.

The following provides descriptions with reference to specific examples. Table 1 provides an example of the configuration information.

TABLE 1

| | Information about a network slice | System feature | NF | NF service |
|---|---|---|---|---|
| 1 | S-NSSAI 1 | System feature 1 | NF 1, NF 2 | NF service 1, NF service 2 |
| | | System feature 2 | NF 3, NF 4 | NF service 3, NF service 4 |
| 2 | S-NSSAI 2 | System feature 3 | NF 5, NF 6 | NF service 5, NF service 6 |
| | | System feature 4 | NF 7, NF 8 | NF service 71, NF service 72, NF service 8 |

Table 1 lists content included in the configuration information sent by the network slice management network element to the NRF. In specific implementation, the system feature in the configuration information may be an identifier of the system feature, the NF in the configuration information may be an identifier of the NF type, and the NF service in the configuration information may be an identifier or a name of the NF service. A unified description is provided herein, and details are not described later.

The S-NSSAI 1 is used to identify a network slice 1, and the S-NSSAI 2 is used to identify a network slice 2.

The network slice 1 supports the system feature 1 and the system feature 2. NFs corresponding to the system feature 1 are the NF 1 and the NF 2. NF services corresponding to the system feature 1 are the NF service 1 and the NF service 2. The NF service 1 is a service in the NF 1, and the NF service 2 is a service in the NF 2. NFs corresponding to the system feature 2 are the NF 3 and the NF 4. NF services corresponding to the system feature 2 are the NF service 3 and the NF service 4. The NF service 3 is a service in the NF 3, and the NF service 4 is a service in the NF 4.

The network slice 2 supports the system feature 3 and the system feature 4. NFs corresponding to the system feature 3 are the NF 5 and the NF 6. NF services corresponding to the system feature 3 are the NF service 5 and the NF service 6. The NF service 5 is a service in the NF 5, and the NF service 6 is a service in the NF 6. NFs corresponding to the system feature 4 are the NF 7 and the NF 8. NF services corresponding to the system feature 4 are the NF service 71, the NF service 72, and the NF service 8. The NF service 71 and the NF service 72 are services in the NF 7, and the NF service 8 is a service in the NF 8.

Operation 302. The NRF stores the configuration information.

For example, the NRF stores the configuration information locally, or stores the configuration information in an external server or a database system that is specially used to store data.

According to the foregoing method, information related to the network slice can be configured for the NRF.

Further, after operation 302, the following operation 303 may further be included.

Operation 303. The NRF sends a configuration completion indication to the network slice management network element. Correspondingly, the network slice management network element may receive the configuration completion indication. The configuration completion indication is used to indicate that configuration is completed.

Further, after the operation 302 or the operation 303, the following operation 304 to operation 306 may further be included.

Operation 304. The NRF receives a notification message from a first network element. Correspondingly, the first network element may send the notification message.

The configuration information of the NRF includes information about one or more network slices, system features supported by the network slices, NFs corresponding to the system features, and NF services corresponding to the NFs.

Any system feature corresponding to any network slice is referred to as a first system feature. Any NF corresponding to the first system feature is referred to as a first NF, and any NF service that is in the NF services corresponding to the NFs and that is corresponding to the first NF is referred to as a first NF service. A network element that supports the first NF is referred to as a first network element.

The notification message includes status information of an NF service of the first network element, and the status information of the NF service of the first network element includes status information of the first NF service.

Table 1 is used as an example. If the first NF is the NF 7 (for example, an SMSF), the first NF service is the NF service 71 (for example, Nsmsf_SMService) and the NF service 72 (for example, Nsmsf_SMSEventExposure). The first network element is a network element (for example, an SMSF network element) that supports the NF 7. For example, NF services in the first network element include the NF service 71, the NF service 72, an NF service 10, and an NF service 11, the status information of the NF service sent by the first network element to the NRF includes status information of the NF service 71, status information of the NF service 72 (the status information of the NF service 71 and the status information of the NF service 72 are referred to as the status information of the first NF service), status information of the NF service 10, and status information of the NF service 11.

Table 1 is used as another example. If the first NF is the NF 8 (for example, an AMF), the first NF service is the NF service 8 (for example, Namf_Communication), and the first network element is a network element (for example, an AMF network element) that supports the NF 8. For example, the NF services in the first network element include the NF service 8 and an NF service 12, the status information of the NF service sent by the first network element to the NRF includes status information of the NF service 8 (the status information of the NF service 8 is referred to as the status information of the first NF service), status information of the NF service 12.

In an implementation, the status information of the NF service of the first network element includes a total quantity of times for which the NF service is invoked by a plurality of other network elements (that is, more than one network element) within preset duration and/or a quantity of times for which the NF service is separately invoked by a single other network element within preset duration. Further, the status information of the NF service of the first network element may further include a quantity of NF service invocation failures and a corresponding failure cause. Specific failure causes include but are not limited to: insufficient resources in the NF, timeout of a timer of the NF service, and no response from a service invoker.

Operation 305. The NRF determines status information of the first system feature based on the status information of the first NF service.

After receiving the status information of the first NF service, the NRF may store the status information of the first NF service in the foregoing configuration information, or separately store the status information of the first NF service.

Table 1 is used as an example. If the first NF is the NF 7 (for example, an SMSF), the first NF service is the NF service 71 (for example, Nsmsf_SMService) and the NF service 72 (for example, Nsmsf_SMSEventExposure), and the first network element (for example, an SMSF network element) is a network element that supports the NF 7, the notification message sent by the first network element includes status information of the NF service 71 and status information of the NF service 72 (the status information of the NF service 71 and the status information of the NF service 72 are referred to as the status information of the first NF service), the status information of the NF service 10 and the status information of the NF service 11. After receiving the notification message, the NRF saves the status information of the NF service 71 and the status information of the NF service 72. Optionally, the NRF may further save the status information of the NF service 10 and the status information of the NF service 11.

Further, the NRF further determines status information of a system feature (that is, the system feature 4 in Table 1) corresponding to the NF service 71 and the NF service 72 based on the status information of the NF service 71 and the status information of the NF service 72. That the NRF determines the status information of the system feature 4 based on the status information of the NF service 71 and the status information of the NF 72 includes but is not limited to the following two methods. Method 1: If both the NF service 71 and the NF service 72 are directly related services for implementing the system feature 4, the NRF may use a sum of quantities of times for which the NF service 71 and the NF service 72 are invoked as a quantity of running times of the system feature 4, that is, as the status information of the system feature 4. Alternatively, the NF service 71 and the quantity of times for which the NF service 71 is invoked, and the NF service 72 and the quantity of times for which the NF service 72 is invoked may also be used as the status information of the system feature 4. Method 2: If the NF service 71 is a directly related service for implementing the system feature 4, and the NF service 72 is an auxiliary service for implementing the system feature 4, that is, the NF service 71 needs to invoke the NF service 72 when the NF service 71 runs, the NRF may use a quantity of times for which the NF service 71 is invoked as a quantity of running times of the system feature 4, that is, as the status information of system feature 4.

When the system feature 4 is corresponding to multiple NF services, the status information of the system feature 4 needs to be determined based on status information of the multiple NF services. Table 1 is used as an example. The system feature 4 is corresponding to the NF 7 and the NF 8, the NF 7 is corresponding to the NF service 71 and the NF service 72, and the NF 8 is corresponding to the NF service 8 (for example, Namf_Communication). In this case, after receiving status information of the NF service 71 and the NF service 72 sent by a network element (that is, an SMSF network element) that supports the NF 7 and receiving status information that is of the NF service 8 and sent by a network element (for example, an AMF network element) that supports the NF 8, the NRF may determine the status information of the system feature 4. For example, if both the NF service 71 and the NF service 72 are directly related services for implementing the system feature 4, and the NF service 8 is an auxiliary service for implementing the system feature 4, the NRF uses a sum of quantities of times for which the NF service 71 and the NF service 72 are invoked as a quantity of running times of the system feature 4, that is, as the status information of system feature 4. For another example, if the NF service 71, the NF service 72, and the NF service 8 are all directly related services for implementing the system feature 4, the NRF uses a sum of quantities of times for which the NF service 71, the NF service 72, and the NF service 8 are invoked as a quantity of running times of the system feature 4, that is, as the status information of system feature 4.

Operation 306. The NRF sends a response message to the first network element. Correspondingly, the first network element may receive the response message. The response message is used to notify the first network element that the notification message has been received.

The operation 306 is an optional operation.

It should be noted that the first network element may be a network element corresponding to any NF in the configuration information. Using Table 1 as an example, the first network element may be a network element that supports the NF 1, a network element that supports the NF 2, or the like. Each first network element proactively reports the status information of the NF service of the first network element, and then the NRF determines status information of the system feature based on the status information of the NF service.

Through the foregoing operation 304 and operation 305, or through the foregoing operation 304 to operation 306, the status information of the system feature in the configuration information may be updated.

Figure 4:
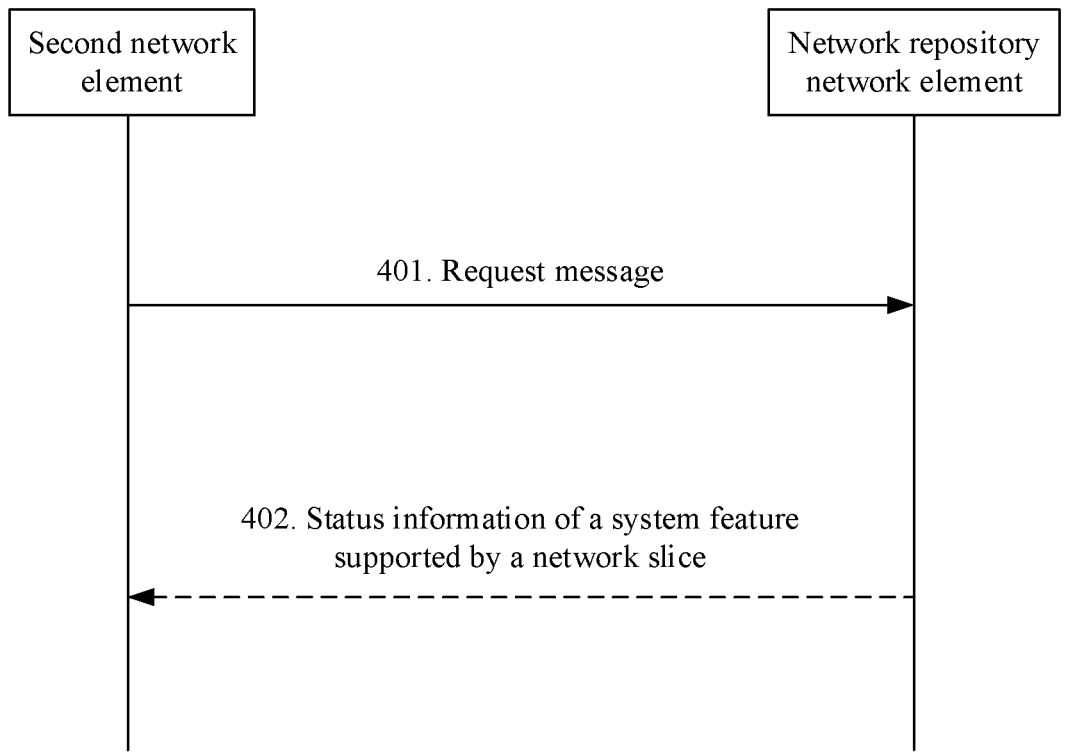
FIG. 4 is a flowchart of another configuration method according to this application.

FIG. 4 is another configuration method according to this application. The method includes the following operations.

Operation 401. A second network element sends a request message to an NRF. Correspondingly, the NRF may receive the request message. The request message includes information about a network slice, and the request message is used to request to obtain status information of a system feature supported by the network slice.

The information about the network slice includes one or more pieces of S-NSSAI.

The second network element herein may be any network element in a network, for example, an AMF, an SMF, an access network device, or the like.

Operation 402. The NRF sends the status information of the system feature supported by the network slice to the second network element based on the request message. Correspondingly, the second network element may receive the status information of the system feature supported by the network slice.

The NRF stores configuration information, the configuration information includes the information about the network slice, the system feature supported by the network slice, an NF and an NF service that are corresponding to the system feature, and the configuration information further includes the status information of the system feature supported by the network slice. For a configuration method of the configuration information in the NRF and an update method of the status information of the system feature in the configuration information, refer to related descriptions of the embodiment shown in FIG. 3. Details are not described herein again.

Based on this solution, the second network element may obtain, from the NRF, the status information of the system feature supported by the network slice. The status information of the system feature supported by the network slice includes status information of an NF service corresponding to the system feature.

In an implementation, if the request message in the operation 401 further includes a second system feature in the system feature supported by the network slice, the request message is used to request to obtain status information of the second system feature. Therefore, in the operation 402, the status information of the system feature supported by the network slice sent by the NRF to the second network includes the status information of the second system feature supported by the network slice. That is, the request message may request to obtain status information of a specified system feature.

As an example, the following describes two specific implementation methods of the embodiment shown in FIG. 4.

In implementation method 1, the request message in the operation 401 further includes a specified time period, and the request message is used to request to obtain the status information of the system feature supported by the network slice within the specified time period. Therefore, in the operation 402, the NRF sends the status information of the system feature supported by the network slice within the specified time period to the second network element.

Further, if the request message further includes the second system feature, the NRF sends the status information of the second system feature within the specified time period to the second network element, and the sent status information of the second system feature within the specified time period may include status information of an NF service corresponding to the second system feature within the specified time period. The status information of the NF service includes a total quantity of times for which the NF service is invoked by a plurality of other network elements within the specified time period and/or a quantity of times for which the NF service is separately invoked by a single other network element within the specified time period. Further, the status information of the NF service may further include a quantity of NF service invocation failures and a corresponding failure cause. Specific failure causes include but are not limited to: insufficient resources in the NF, timeout of a timer of the NF service, and no response from a service invoker.

It should be noted that, in specific implementation, the request message in the implementation method 1 may also be referred to as a query message, a network slice status request message, or the like.

In implementation method 2, the request message in the operation 401 further includes a subscription period, and the request message is used to request to periodically obtain the status information of the system feature supported by the network slice. Therefore, in the operation 402, the NRF periodically sends the status information of the system feature supported by the network slice to the second network slice based on the subscription period in the request message, and the status information of the system feature supported by the network slice includes status information of the NF service corresponding to the system feature within the subscription period.

Further, if the request message further includes the second system feature, the NRF periodically sends the status information of the second system feature to the second network element, and the sent status information of the second system feature may include the status information of the NF service corresponding to the second system feature within the subscription period. The status information of the NF service includes a total quantity of times for which the NF service is invoked by a plurality of other network elements within the subscription period and/or a quantity of times for which the NF service is separately invoked by a single other network element within the subscription period. Further, the status information of the NF service may further include a quantity of NF service invocation failures and a corresponding failure cause. Specific failure causes include but are not limited to: insufficient resources in the NF, timeout of a timer of the NF service, and no response from a service invoker.

A main difference between the implementation method 1 and the implementation method 2 lies in that: In the implementation method 1, the NRF sends the status information of the system feature supported by the network slice to the second network element based on the request message of the second network element; in the implementation method 2, the NRF periodically sends the status information of the system feature supported by the network slice to the second network element based on a system feature status subscription request of the second network element, where the system feature status subscription request includes a time period of the system feature supported by the network slice and/or a quantity of times for reporting a system feature status.

According to the foregoing method, the second network element may obtain, from the NRF, the status information of the system feature supported by the network slice, so as to accurately learn of a running status of the system feature.

It should be noted that the first network element and the second network element in this application may be a same network element, or may be different network elements. The first network element and the second network element are merely used as names for differentiation. In actual application, the first network element and the second network element may have specific names. This is not limited in this application.

It may be understood that to implement the foregoing functions, each network element includes a corresponding hardware structure and/or software module for implementing each function. A person skilled in the art should easily be aware that, in combination with the examples described in the embodiments disclosed in this specification, units and algorithm operations may be implemented by hardware or a combination of hardware and computer software in the present invention. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present invention.

Figure 5:
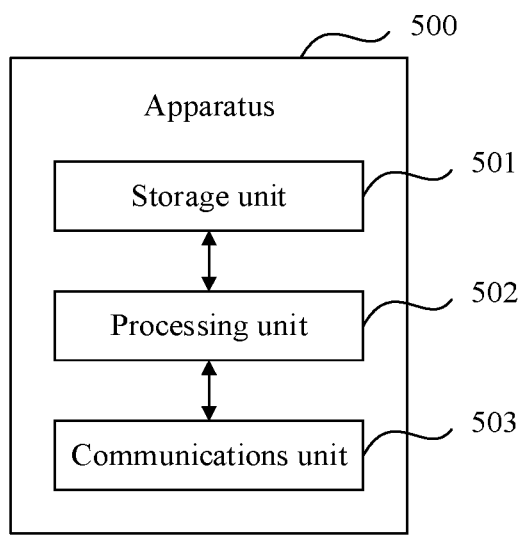
FIG. 5 is a schematic diagram of an apparatus according to this application.

When an integrated unit is used, FIG. 5 is a block diagram of a possible example of an apparatus according to an embodiment of the present invention. An apparatus 500 may exist in a form of software. The apparatus 500 may include a processing unit 502 and a communications unit 503. In an implementation, the communications unit 503 may include a receiving unit and a sending unit. The processing unit 502 is configured to control and manage behavior of the apparatus 500. The communications unit 503 is configured to support communication between the apparatus 500 and another network entity. The apparatus 500 may further include a storage unit 501, configured to store program code and data of the apparatus 500.

The processing unit 502 may be a processor or a controller, for example, may be a general-purpose central processing unit (CPU), a general-purpose processor, a digital signal processor (DSP), an application-specific integrated circuit (ASIC), a field programmable gate array (FPGA), or another programmable logic device, a transistor logic device, a hardware component, or any combination thereof. The processing unit 502 may implement or execute various example logical blocks, modules, and circuits described with reference to content disclosed in the present invention. Alternatively, the processor may be a combination of processors implementing a computing function, for example, a combination of one or more microprocessors, or a combination of the DSP and the microprocessor. The communications unit 503 may be a communications interface, a transceiver, a transceiver circuit, or the like, where the communications interface is a general name, and may include a plurality of interfaces during specific implementation. The storage unit 501 may be a memory.

The apparatus 500 may be a network slice management network element in this application, or may be a chip in the network slice management network element. The processing unit 502 may support the apparatus 500 in performing actions of the network slice management network element in the foregoing method examples. The communications unit 503 may support communication between the apparatus 500 and a network repository network element. For example, the communications unit 503 is configured to support the apparatus 500 in performing the operation 301 and the operation 303 in FIG. 3.

When the communications unit 503 includes the sending unit and the receiving unit, the sending unit is configured to send configuration information to the network repository network element, and the configuration information includes information about a network slice, a system feature supported by the network slice, a network function NF corresponding to the system feature, and an NF service corresponding to the NF; and the receiving unit is configured to receive a configuration completion indication from the network repository network element.

The apparatus 500 may be the network repository network element in this application, or may be the chip in the network repository network element. The processing unit 502 may support the apparatus 500 in performing actions of the network repository network element in the foregoing method examples. For example, the processing unit 502 is configured to support the apparatus 500 in performing the operation 302 and the operation 305 in FIG. 3, and/or is configured to perform another process of the technology described in this specification. The communications unit 503 is configured to support the apparatus 500 in communicating with the network slice management network element, a first network element and a second network element. For example, a communications unit is configured to support the apparatus 500 in performing the operation 301, the operation 303, and the operation 304 in FIG. 3, and the operation 401 and the operation 402 in FIG. 4.

When the communications unit 503 includes the sending unit and the receiving unit, in an embodiment, the receiving unit is configured to receive configuration information from the network slice management network element, where the configuration information includes information about a network slice, a system feature supported by the network slice, a network function NF corresponding to the system feature, and an NF service corresponding to the NF; and the processing unit is configured to store the configuration information in a storage unit.

In an embodiment, the system feature includes a first system feature, an NF corresponding to the first system feature includes a first NF, and the NF service corresponding to the NF includes a first NF service corresponding to the first NF. The receiving unit is further configured to receive a notification message from the first network element, where the first network element is a network element that supports the first NF, the notification message includes status information of an NF service of the first network element, and the status information of the NF service of the first network element includes status information of the first NF service; and the processing unit is further configured to determine status information of the first system feature based on the status information of the first NF service.

In an embodiment, the status information of the NF service of the first network element includes a total quantity of times for which the NF service is invoked by a plurality of other network elements within preset duration and/or a quantity of times for which the NF service is separately invoked by a single other network element within preset duration.

When the communications unit 503 includes the sending unit and the receiving unit, in another embodiment, the receiving unit is configured to receive a request message from the second network element, where the request message includes information about a network slice, and the request message is used to request to obtain status information of a system feature supported by the network slice; and the sending unit is configured to send the status information of the system feature supported by the network slice to the second network element based on the request message.

In an embodiment, the request message further includes a specified time period. The request message is used to request to obtain the status information of the system feature supported by the network slice within the specified time period; and the sending unit is configured to send the status information of the system feature supported by the network slice within the specified time period to the second network element.

In an embodiment, the status information of the system feature supported by the network slice within the specified time period includes a total quantity of times for which an NF service corresponding to the system feature is invoked by a plurality of other network elements within the specified time period and/or a quantity of times for which the NF service is separately invoked by a single other network element within the specified time period.

In an embodiment, the request message further includes a subscription period. The request message is used to request to periodically obtain the status information of the system feature supported by the network slice; and the sending unit is configured to periodically send the status information of the system feature supported by the network slice to the second network element based on the subscription period in the request message.

In an embodiment, the status information of the system feature supported by the network slice includes a total quantity of times for which an NF service corresponding to the system feature is invoked by a plurality of other network elements within the subscription period and/or a quantity of times for which the NF service is separately invoked by a single other network element within the subscription period.

The apparatus 500 may be the second network element related in this application, or may be a chip in the second network element. The processing unit 502 may support the apparatus 500 in performing actions of the second network element in the foregoing method examples. The communications unit 503 may support communication between the apparatus 500 and the network repository network element. For example, the communications unit 503 is configured to support the apparatus 500 in performing the operation 401 and the operation 402 in FIG. 4.

When the communications unit 503 includes the sending unit and the receiving unit, the sending unit is configured to send a request message to the network repository network element, where the request message includes information about a network slice, and the request message is used to request to obtain status information of a system feature supported by the network slice; and the receiving unit is configured to receive the status information of the system feature supported by the network slice from the network repository network element.

In an embodiment, the request message further includes a specified time period. The request message is used to request to obtain the status information of the system feature supported by the network slice within the specified time period; and the receiving unit is configured to receive the status information of the system feature supported by the network slice within the specified time period from the network repository network element.

In an embodiment, the status information of the system feature supported by the network slice within the specified time period includes a total quantity of times for which an NF service corresponding to the system feature is invoked by a plurality of other network elements within the specified time period and/or a quantity of times for which the NF service is separately invoked by a single other network element within the specified time period.

In an embodiment, the request message further includes a subscription period. The request message is used to request to periodically obtain the status information of the system feature supported by the network slice; and the receiving unit is configured to receive the status information that is of the system feature supported by the network slice and that is periodically sent by the network repository network element based on the subscription period.

In an embodiment, the status information of the system feature supported by the network slice includes a total quantity of times for which an NF service corresponding to the system feature is invoked by a plurality of other network elements within the subscription period and/or a quantity of times for which the NF service is separately invoked by a single other network element within the subscription period.

Figure 6:
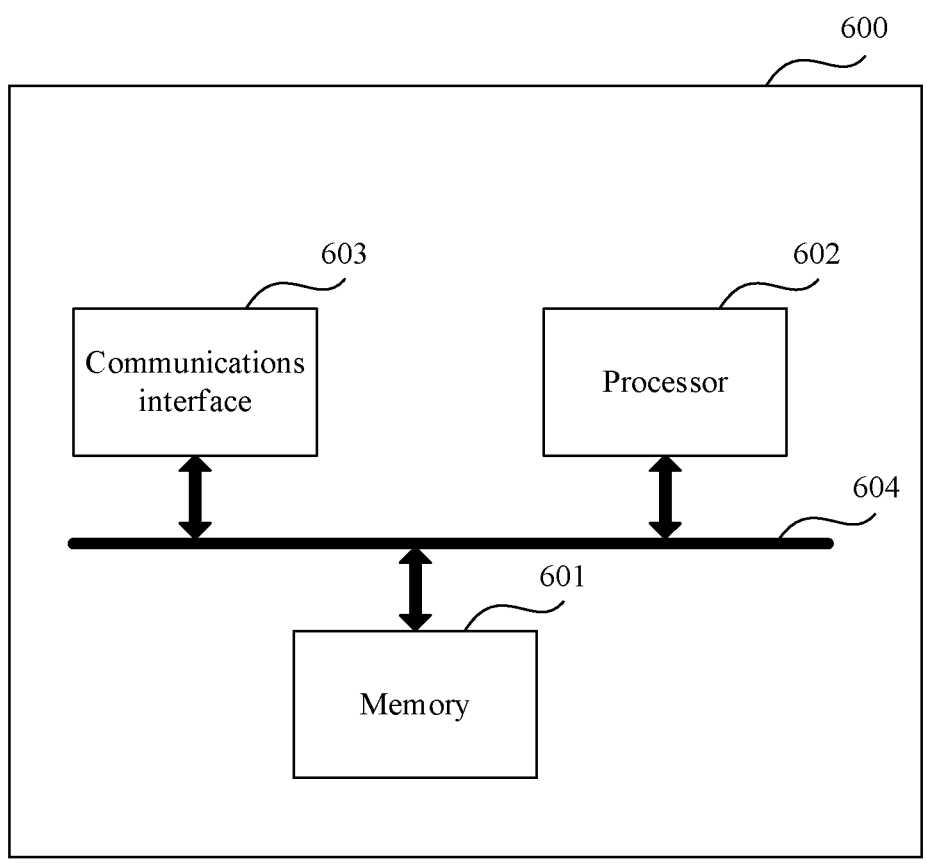
FIG. 6 is a schematic diagram of another apparatus according to this application.

FIG. 6 is a schematic diagram of an apparatus according to this application. The apparatus may be a network slice management network element, a network repository network element, or a second network element. An apparatus 600 includes a processor 602, a communications interface 603, and a memory 601. Optionally, the apparatus 600 may further include a bus 604. The communications interface 603, the processor 602, and the memory 601 may be connected to each other through the bus 604. The bus 604 may be a peripheral component interconnect (PCI) bus, an extended industry standard architecture (EISA) bus, or the like. The bus 604 may be classified into an address bus, a data bus, a control bus, and the like. For ease of representation, only one thick line is used to represent the bus in FIG. 6, but this does not mean that there is only one bus or only one type of bus.

The processor 602 may be a CPU, a microprocessor, an ASIC, or one or more integrated circuits configured to control program execution in the solutions of this application.

The communications interface 603 uses any apparatus like a transceiver, and is configured to communicate with another device or a communications network, for example, an Ethernet, a radio access network (RAN), a wireless local area network (WLAN), a wired access network, or the like.

The memory 601 may be a read-only memory (ROM) or another type of static storage device that can store static information and an instruction, or a random access memory (RAM) or another type of dynamic storage device that can store information and an instruction, or may be an electrically erasable programmable read-only memory (EEPROM), a compact disc read-only memory (CD-ROM) or another compact disc storage, an optical disc storage (including a compressed optical disc, a laser disc, an optical disc, a digital versatile disc, a Blu-ray disc, or the like), a magnetic disk storage medium or another magnetic storage device, or any other medium that can be used to carry or store expected program code in a form of an instruction or a data structure and that can be accessed by a computer, but is not limited thereto. A memory may exist independently, and is connected to a processor through the bus 604. The memory may alternatively be integrated with the processor.

The memory 601 is configured to store a computer-executable instruction for executing the solutions in this application, and the processor 602 controls the execution. The processor 602 is configured to execute the computer-executable instruction stored in the memory 601, to implement the configuration method provided in the foregoing embodiments of this application.

Optionally, the computer-executable instruction in this embodiment of this application may also be referred to as application program code. This is not limited in this embodiment of this application.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or the functions according to the embodiments of this application are completely or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from one web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

The various illustrative logical units and circuits described in the embodiments of this application may implement or operate the described functions through a general purpose processor, a digital signal processor, an application-specific integrated circuit (ASIC), a field programmable gate array (FPGA) or another programmable logical apparatus, a discrete gate or transistor logic, a discrete hardware component, or a design of any combination thereof. The general-purpose processor may be a microprocessor. Optionally, the general-purpose processor may be alternatively any conventional processor, controller, microcontroller, or state machine. The processor may alternatively be implemented by a combination of computing apparatuses, such as a digital signal processor and a microprocessor, a plurality of microprocessors, one or more microprocessors in combination with a digital signal processor core, or any other similar configuration.

Operations of the methods or algorithms described in the embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium of any other form in the art. For example, the storage medium may connect to a processor, so that the processor may read information from the storage medium and write information into the storage medium. Optionally, the storage medium may further be integrated into a processor. The processor and the storage medium may be disposed in an ASIC, and the ASIC may be disposed in a terminal. Optionally, the processor and the storage medium may also be disposed in different components of a terminal.

These computer program instructions may also be loaded onto a computer or another programmable data processing device, so that a series of operations and operations are performed on the computer or the another programmable device, thereby generating computer-implemented processing. Therefore, the instructions executed on the computer or the another programmable device provide operations for implementing a specified function in one or more processes in the flowcharts and/or in one or more blocks in the block diagrams.

Although this application is described with reference to specific features and the embodiments thereof, it is clear that various modifications and combinations may be made to them without departing from the spirit and scope of this application. Correspondingly, the specification and the accompanying drawings are merely example description of this application defined by the appended claims, and is considered as any of or all modifications, variations, combinations or equivalents that cover the scope of this application. It is clear that a person skilled in the art can make various modifications and variations to this application without departing from the spirit and scope of this application. This application is intended to cover these modifications and variations of this application provided that they fall within the scope of the claims of this application and their equivalent technologies.

What is claimed is:

1. An apparatus, comprising:
a processor; and
a memory coupled to the processor and storing instructions that, when executed by the processor, cause the apparatus to:
receive a request message from a second network element of a network, wherein the request message comprises information about a network slice, and requests to obtain status information of a system feature supported by the network slice, wherein the system feature is a network service provided by the network; and
send, based on the request message, the status information of the system feature supported by the network slice to the second network element,
wherein the request message further comprises a specified time period, and requests to obtain the status information of the system feature supported by the network slice within the specified time period.

2. The apparatus according to claim 1, wherein the instructions cause the apparatus to:
send the status information of the system feature supported by the network slice within the specified time period to the second network element.

3. The apparatus according to claim 2, wherein the status information of the system feature supported by the network slice within the specified time period comprises at least one of a total quantity of times for which an network function (NF) service corresponding to the system feature is invoked by a plurality of other network elements within the specified time period or a quantity of times for which the NF service is separately invoked by a single other network element within the specified time period.

4. The apparatus according to claim 1, wherein the request message further comprises a subscription period, and requests to periodically obtain the status information of the system feature supported by the network slice; and
wherein the instructions cause the apparatus to:
periodically send, based on the subscription period in the request message, the status information of the system feature supported by the network slice to the second network element.

5. The apparatus according to claim 4, wherein the status information of the system feature supported by the network slice comprises at least one of a total quantity of times for which a network function(NF) service corresponding to the system feature is invoked by a plurality of other network elements within the subscription period or a quantity of times for which the NF service is separately invoked by a single other network element within the subscription period.

6. The apparatus according to claim 1, wherein the instructions further cause the apparatus to:
receive configuration information from a network slice management network element, wherein the configuration information comprises information about the network slice, the system feature supported by the network slice, a network function (NF) corresponding to the system feature, and an NF service corresponding to the NF; and
store the configuration information.

7. The apparatus according to claim 6, wherein the system feature comprises a first system feature, an NF corresponding to the first system feature comprises a first NF, the NF service corresponding to the NF comprises a first NF service corresponding to the first NF, and the instructions further cause the apparatus to:
receive a notification message from a first network element, wherein the first network element is a network element that supports the first NF, the notification message comprises status information of an NF service of the first network element, and the status information of the NF service of the first network element comprises status information of the first NF service; and
determine status information of the first system feature based on the status information of the first NF service.

8. The apparatus according to claim 7, wherein the status information of the NF service of the first network element comprises at least one of a total quantity of times for which the NF service is invoked by a plurality of other network elements within preset duration or a quantity of times for which the NF service is separately invoked by a single other network element within preset duration.

9. The apparatus according to claim 1, wherein the request message further comprises a second system feature in the system feature supported by the network slice, and the status information of the system feature supported by the network slice comprises status information of an NF service corresponding to the second system feature.

10. An apparatus, comprising:
a processor; and
a memory coupled to the processor and storing instructions that, when executed by the processor, cause the apparatus to:
send a request message to a network repository network element of a network, wherein the request message comprises information about a network slice, and requests to obtain status information of a system feature supported by the network slice, wherein the system feature is a network service provided by the network; and
receive the status information of the system feature supported by the network slice from the network repository network element,
wherein the request message further comprises a specified time period, and the request message is used to request to obtain the status information of the system feature supported by the network slice within the specified time period.

11. The apparatus according to claim 10, wherein the instructions cause the apparatus to:
receive the status information of the system feature supported by the network slice within the specified time period from the network repository network element.

12. The apparatus according to claim 11, wherein the status information of the system feature supported by the network slice within the specified time period comprises at least one of a total quantity of times for which a network function (NF) service corresponding to the system feature is invoked by a plurality of other network elements within the specified time period or a quantity of times for which the NF service is separately invoked by a single other network element within the specified time period.

13. The apparatus according to claim 10, wherein the request message further comprises a subscription period, and the request message is used to request to periodically obtain the status information of the system feature supported by the network slice; and the instructions further cause the apparatus to:
receive the status information that is of the system feature supported by the network slice and that is periodically sent by the network repository network element based on the subscription period.

14. The apparatus according to claim 13, wherein the status information of the system feature supported by the network slice comprises at least one of a total quantity of times for which a network function(NF) service corresponding to the system feature is invoked by a plurality of other network elements within the subscription period or a quantity of times for which the NF service is separately invoked by a single other network element within the subscription period.

15. The apparatus according to claim 10, wherein the request message further comprises a second system feature in the system feature supported by the network slice, and the status information of the system feature supported by the network slice comprises status information of a network function(NF) service corresponding to the second system feature.

16. A system, comprising:
a network repository network element running on a first processor; and a second network element running on a second processor;
wherein the network repository network element is to:
  receive a request message from a second network element of a network, wherein the request message comprises information about a network slice, and requests to obtain status information of a system feature supported by the network slice, wherein the system feature is a network service provided by the network; and
  send, based on the request message, the status information of the system feature supported by the network slice to the second network element;
the second network element is to:
  send the request message to the network repository network element; and
  receive the status information of the system feature supported by the network slice from the network repository network element,
wherein the request message further comprises a specified time period, and the request message requests to obtain the status information of the system feature supported by the network slice within the specified time period.

17. The system according to claim 16, wherein
the network repository network element is to:
  send the status information of the system feature supported by the network slice within the specified time period to the second network element; and
the second network element is to:
  receive the status information of the system feature supported by the network slice within the specified time period from the network repository network element.

18. The system according to claim 17, wherein the status information of the system feature supported by the network slice within the specified time period comprises at least one of a total quantity of times for which an NF service corresponding to the system feature is invoked by a plurality of other network elements within the specified time period or a quantity of times for which the NF service is separately invoked by a single other network element within the specified time period.

19. The system according to claim 16, wherein the request message further comprises a subscription period, and the request message requests to periodically obtain the status information of the system feature supported by the network slice; and
  the network repository network element is to:
    periodically send, based on the subscription period in the request message, the status information of the system feature supported by the network slice to the second network element; and
  the second network element is to:
    receive the status information that is of the system feature supported by the network slice and that is periodically sent by the network repository network element based on the subscription period.

20. The system according to claim 19, wherein the status information of the system feature supported by the network slice comprises at least one of a total quantity of times for which a network function (NF) service corresponding to the system feature is invoked by a plurality of other network elements within the subscription period or a quantity of times for which the NF service is separately invoked by a single other network element within the subscription period.

* * * * *